United States Patent [19]

Takiyama et al.

[11] Patent Number: 5,777,750
[45] Date of Patent: Jul. 7, 1998

[54] IMAGE PROCESSING METHOD AND APPARATUS WHICH INCLUDES A COLOR REVERSING FUNCTION FOR A TWO-COLOR IMAGE

[75] Inventors: Yasuhiro Takiyama, Kawasaki; Ryosuke Miyamoto, Urayasu; Hideaki Shimizu, Yokohama; Hiroyuki Yaguchi, Inagi; Tadashi Takahashi, Yokohama, all of Japan

[73] Assignee: Canon Kabushiki Kaisha, Tokyo, Japan

[21] Appl. No.: 660,337

[22] Filed: Jun. 21, 1996

[30] Foreign Application Priority Data

Jun. 26, 1995 [JP] Japan ................ 7-159250

[51] Int. Cl.[6] .................. H04N 1/40; H04N 1/46; G03F 3/08; G06K 9/60
[52] U.S. Cl. .................. 358/298; 358/501; 358/518; 358/538; 382/164; 399/184

[58] Field of Search ................ 358/296, 298, 358/300, 501, 504, 518, 520, 523, 529, 530, 537, 538; 382/162, 164, 167; 347/131, 232; 399/1, 2, 4, 38, 54, 184

[56] References Cited

U.S. PATENT DOCUMENTS

| 5,187,521 | 2/1993 | Shimizu et al. | 355/202 |
| 5,539,524 | 7/1996 | Hasebe et al. | 358/296 |
| 5,581,359 | 12/1996 | Kaburagi et al. | 358/298 |
| 5,680,230 | 10/1997 | Kaburagi et al. | 358/520 |
| 5,684,600 | 11/1997 | Miyazaki et al. | 358/298 |

*Primary Examiner*—Eric Frahm
*Attorney, Agent, or Firm*—Fitzpatrick, Cella, Harper & Scinto

[57] ABSTRACT

Image data is separated into two colors to obtain two-color image data to form a two-color image. The two-color image data is reversed to obtain reversed two-color image data, which is output to an image forming device which forms an image of two colors.

25 Claims, 13 Drawing Sheets

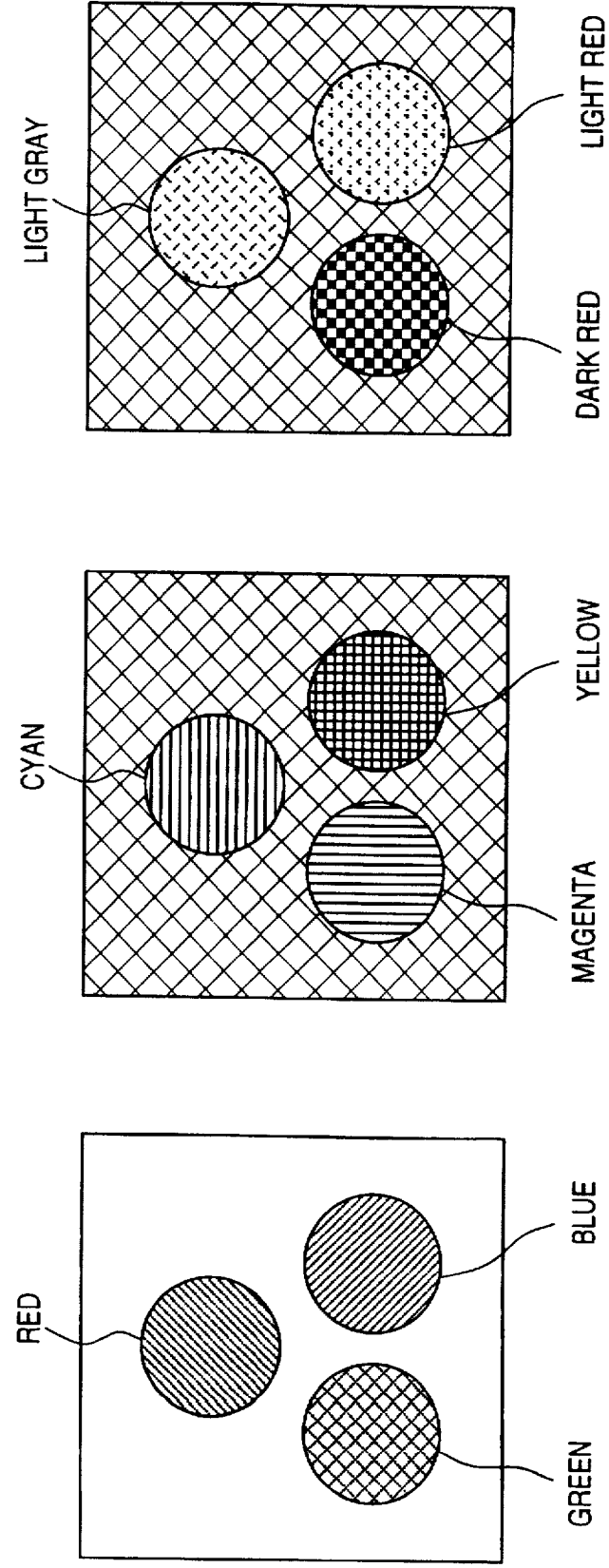

IMAGE PROCESSING METHOD AND
APPARATUS WHICH INCLUDES A COLOR
REVERSING FUNCTION FOR A TWO-
COLOR IMAGE

BACKGROUND OF THE INVENTION

The present invention relates to an image processing method and apparatus for outputting image data which is separated into two colors.

Conventionally, a two-color image forming apparatus for forming a two-color image based on full-color image data to form visible images has been proposed. Moreover, an image reverse process (reversing negative and positive) is a function generally included in a monochrome image forming apparatus or a color image forming apparatus.

Note that in the present application, "reversing image data" means transforming of image data such as obtaining complementary color data, complementing color density data, or reversing negative and positive. An image reverse process is a process for reversing image data, and a reversed image is an image obtained by performing the image reverse process.

As to two-color image data, if complementary colors for each of the two colors are obtained to form a reversed two-color image, the obtained two-color image may include a color other than the original two colors. For instance, in a case where two-color image data consists of red and black and each of the colors is complemented to obtain a reversed image, a green and black image or a green and white image will be obtained, since a complementary color of red is green. Therefore, such two-color image forming apparatus cannot print a reversed two-color image data. Furthermore, if density of the two colors is simply reversed, a white portion of the original image cannot be determined or which color is to be printed. Both a deep black portion and a deep red portion are converted to white; therefore, the black portion and red portion in the original image cannot be distinguished in the reversed two-color image.

As described above, for a two-color image forming apparatus where an original image is separated into two colors and outputted in two colors, an apparatus including an image reverse processing function is not known since there is no appropriate method for obtaining a reversed two-color image.

SUMMARY OF THE INVENTION

A separation means separates image data into two colors to obtain two-color image data which is reversed by a reverse means to obtain reversed two-color image data. An output means outputs the reversed two-color image data to an image forming apparatus which forms an image of two colors.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A, 5B and 5C are diagrams illustrating the steps of outputting an image as a reversed two-color image of an original color document according to a first embodiment;

DETAILED DESCRIPTION OF THE PREFERRED EMBODIMENTS

Preferred embodiments of the present invention will be described in detail in accordance with the accompanying drawings.

[First Embodiment]

Figure 1:
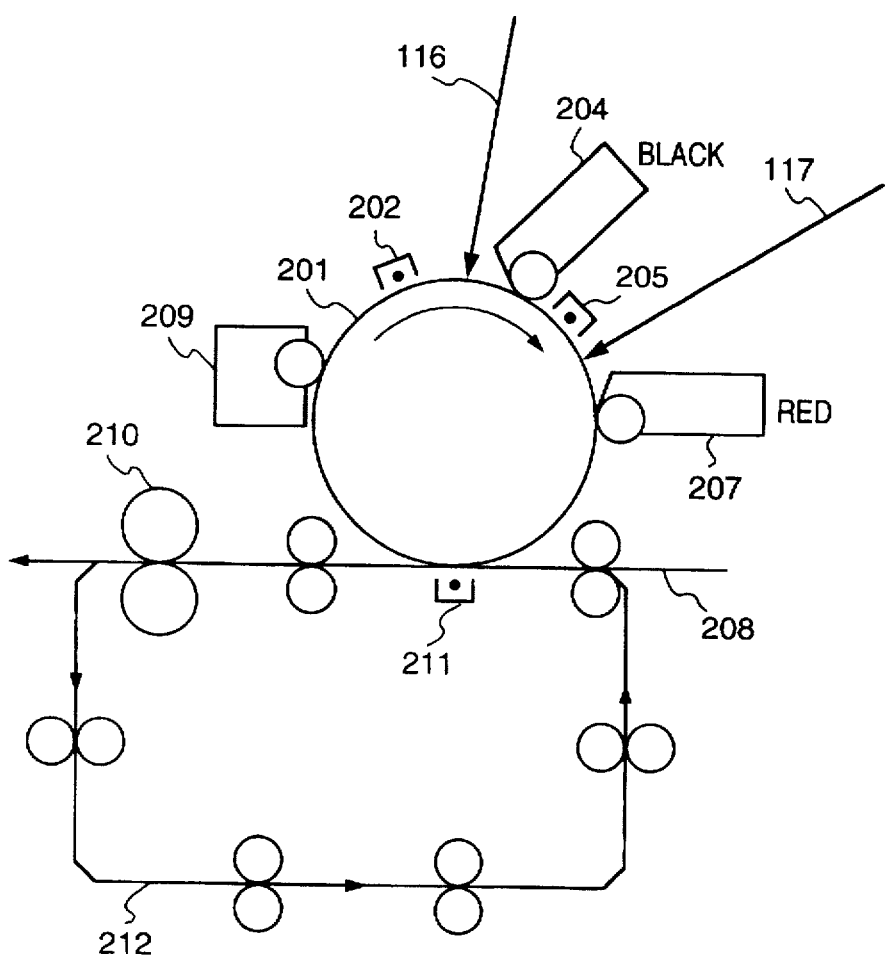
FIG. 1 is a general structural view of a main body of a two-color image forming apparatus according to present embodiments.

FIG. 1 shows a general structure of a main body of a two-color image forming apparatus according to the first embodiment. In FIG. 1, reference numeral 201 denotes a photosensitive drum which performs image developing when irradiated by a laser beam. More specifically, the photosensitive drum 201 is uniformly electrified by a first electrostatic charger 202; then a black image is recorded on the photosensitive drum 201 by a black-developing laser beam 116, and developed by a black image developer 204. Development for a red image is performed in a similar manner to that of the above described black image. That is, the photosensitive drum 201 is again uniformly electrified by a first electrostatic charger for a red image 205 and a red image is developed by a red image developer 207.

Then, the image is transferred on a print sheet conveyed on a print sheet conveying table 208 by a transferring electrostatic charger 211. Toner on the print sheet is dissolved and fixed by a heat fixer 210. The remaining toner on the photosensitive drum 201 is removed by a cleaner 209.

Figure 2:
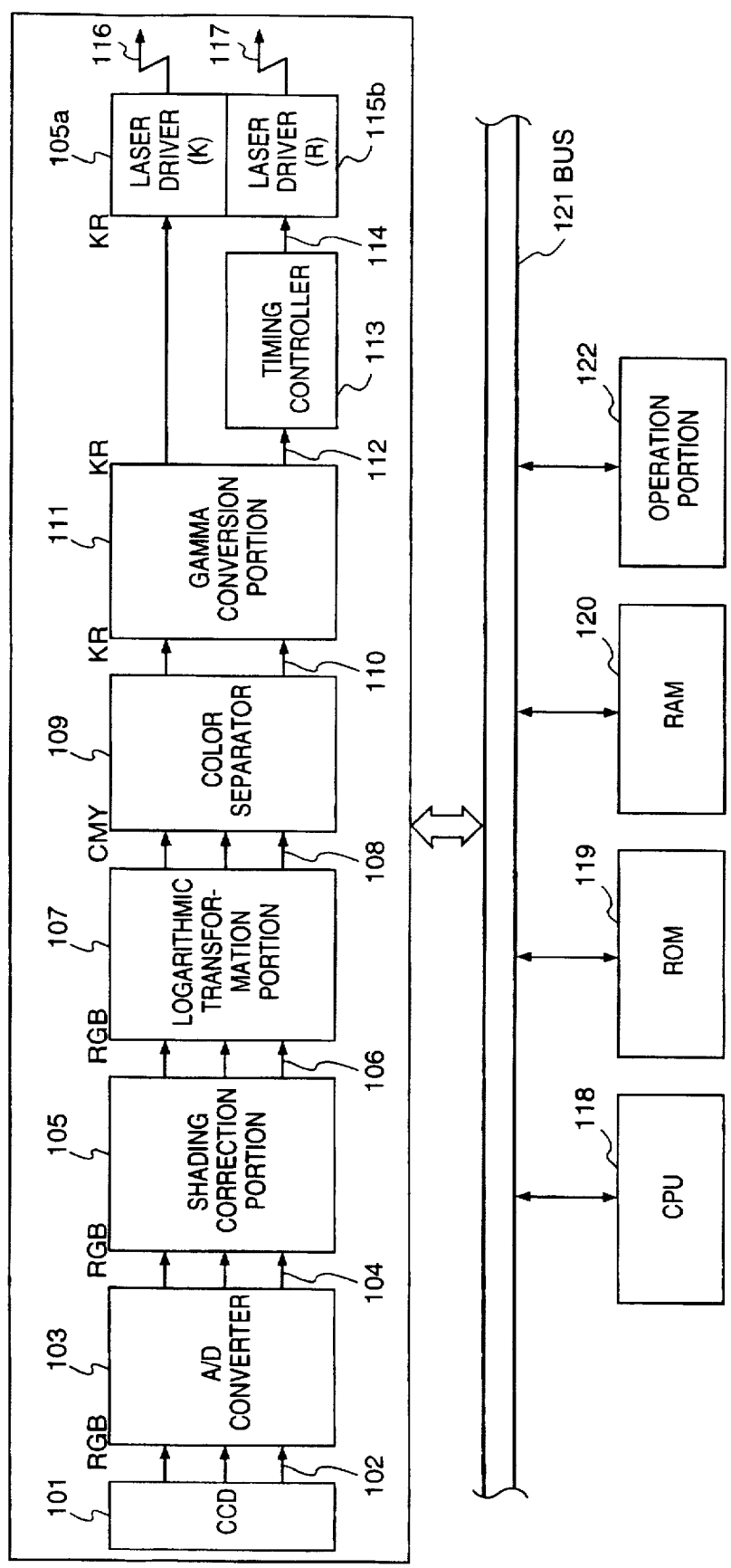
FIG. 2 is a block diagram illustrating a structural example of image processing control in a two-color image forming apparatus according to the present embodiments.

FIG. 2 shows a structure of image processing control in the two-color image forming apparatus.

An image is first read from an original document, placed on a document reader, by a CCD line sensor 101 as R, G, and B image data 102. Then, analog/digital conversion is performed by an A/D converter 103, and shading correction is performed for the digital signal by a shading correction portion 105 to correct nonuniformity of sensor output. Next, each of luminance signals 106: RED, GREEN and BLUE are logarithmically transformed into density signals 108: CYAN, MAGENTA and YELLOW by a logarithmic transformation portion 107.

Figure 3A:
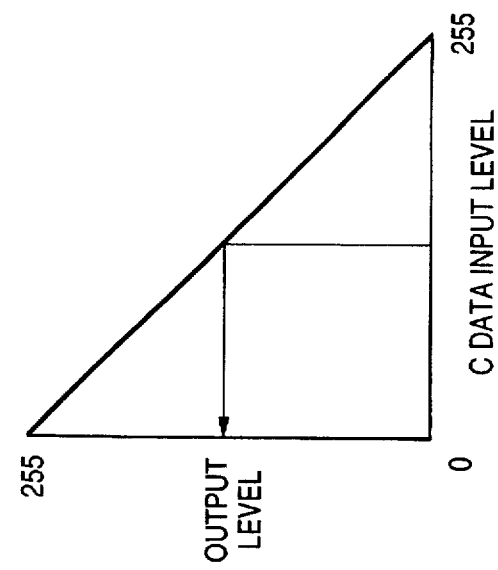
FIGS. 3A, 3B and 3C are graphs showing characteristics of density level conversion to complement density data.
Figure 3B:
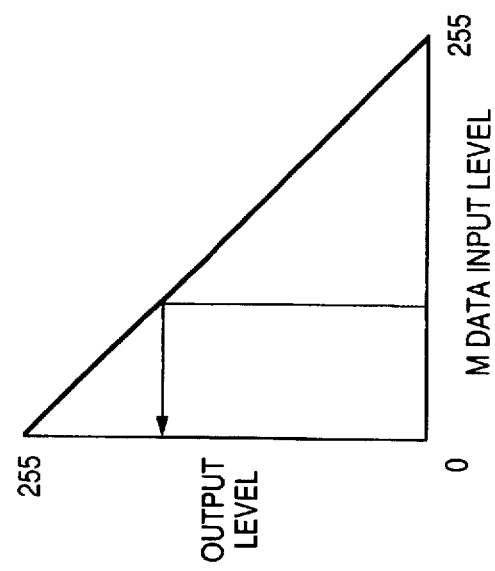
Figure 3C:
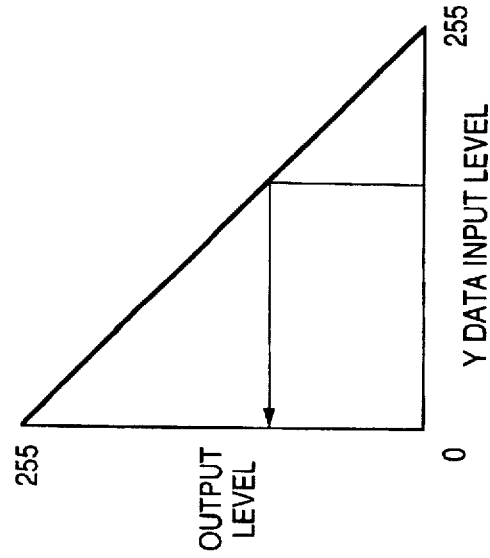
Figure 4A:
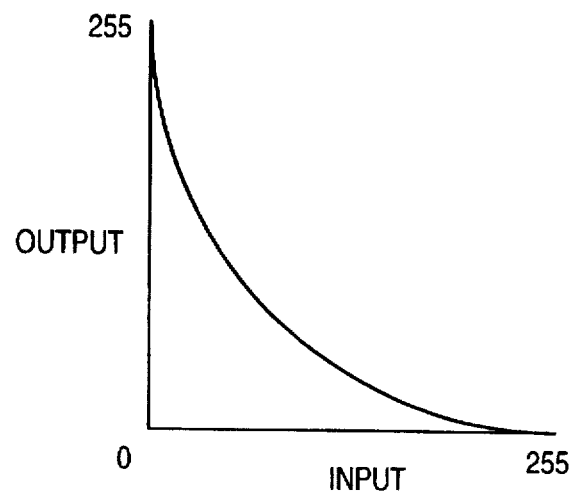
FIGS. 4A and 4B are graphs showing transformation tables for forming a density-reversed image used in a logarithmic transformation portion.

Further, in the logarithmic transformation portion 107, density level conversion which will be described later is performed for each of the density data: CYAN, MAGENTA and YELLOW to reverse each of the density data. For example, in this embodiment, C, M and Y data are complemented respectively. The characteristic of density level conversion for reversing (complementing) density data will be shown in FIGS. 3A to 3C. Herein, an example is given for performing density level conversion for CYAN, MAGENTA and YELLOW data. However, the similar effect can be obtained by utilizing a logarithmic transformation table (FIG. 4B) which includes an image reverse process such as density complement, instead of the normal logarithmic transformation table (FIG. 4A).

At a color separator 109, a black signal K110 and a red signal R110 are generated based upon the CYAN, MAGENTA and YELLOW data and density gradient correction is performed for a printer at a gamma conversion portion 111. As is apparent from the structure described above with reference to FIG. 1, a red image is developed after a black image is developed; therefore, timing adjustment is performed for a red image signal 112 by a timing controller 113. Each image signal is converted to black-developing laser beam 116 and a red developing laser beam 117 respectively by laser drivers 115a and 115b and image recording is executed.

Note that whether or not the aforementioned image reverse process is to be performed can be instructed by manual operation from an operation portion 122. In other words, according to manual instruction from the operation portion 122, whether or not the density reverse process is to be performed as shown in FIGS. 3A to 3C by a CPU 118 is instructed to the logarithmic transformation portion 107. Alternatively, the table (FIG. 4A) stored in a ROM 119 for performing a normal operation or the table (FIG. 4B) for performing a transformation process can be set at the logarithmic transformation portion 107. In this case, the CPU 118 utilizes a RAM 120 as a work memory. Bus 121 connects the above components to perform data communication.

Next, an example will be provided for a case where an image reverse process is performed on an image, with reference to FIGS. 5A to 5C. FIGS. 5A to 5C show the steps of outputting an image as a reversed two-color image of an original color image.

FIG. 5A shows an original color image. The original image in the example includes three circles colored with red, green and blue. FIG. 5B shows image data where the logarithmic transformation process and density reverse process as described above are performed at the logarithmic transformation portion 107. These three circles are expressed in cyan, magenta and yellow respectively, and the background is expressed in black. FIG. 5C shows the image data on which color separation process is performed where the three circles are expressed in light gray, dark red and light red respectively. Note that the conventional color separation process can be utilized for the above color separation process.

Figure 6A:
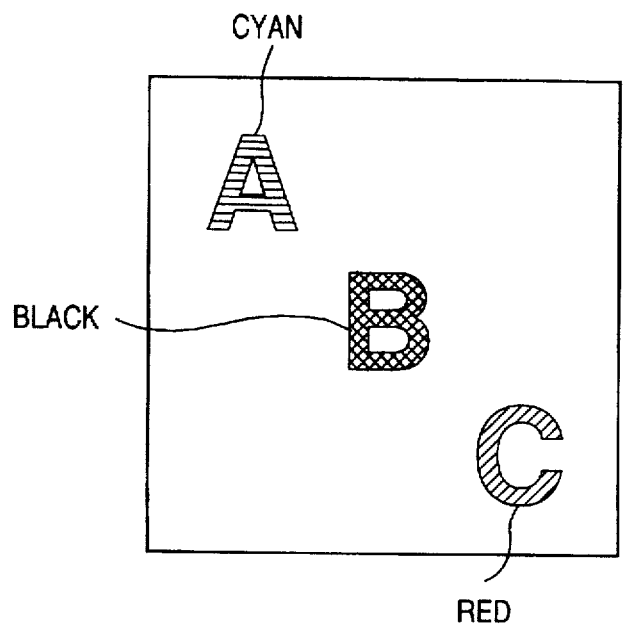
FIGS. 6A and 6B are diagrams illustrating the steps of outputting an image as a reversed two-color image of an original color document according to the first embodiment.
Figure 6B:
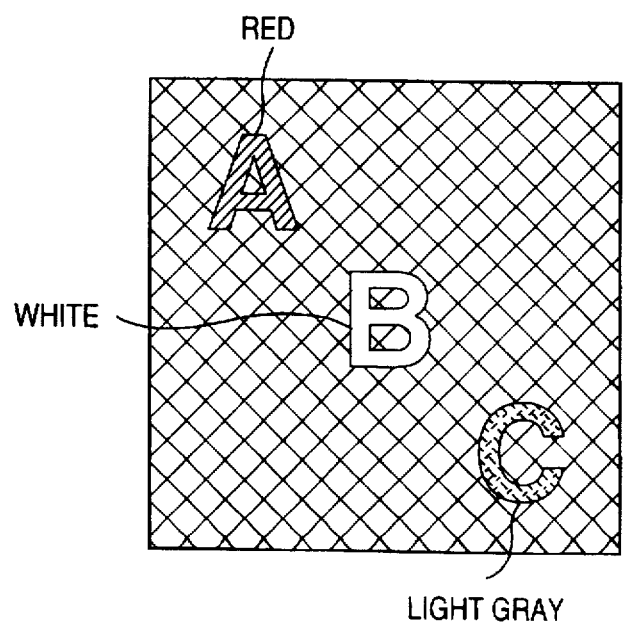

A further example of image output is provided in FIGS. 6A and 6B. The original document in FIG. 6A includes three letters, which are colored in cyan, black and red. When the transformation process as described above is performed on the image, a two-color transformed image can be obtained as shown in FIG. 6B where each of the letters is expressed in red, white and light gray respectively, and the background is expressed in black.

As set forth above, a reversed image can be formed by the two-color image forming apparatus according to the first embodiment. Note that according to the first embodiment, the image reverse process is performed on C, M and Y data, then the separation process of separating into two colors is performed on the density reversed C, M and Y data. Such two-color reverse process is mainly utilized for a photographic image. For instance, a two-color image in red and black corresponding to a positive picture can be obtained by performing the image reverse process on C, M and Y data of a negative image on a film and the color separation process on the reversed C, M and Y data. In a case where C, M, Y and K data is generated by the logarithmic transformation portion, the image reverse process is performed on the C, M, Y and K data, and the color separation process is then performed.

Figure 4B:
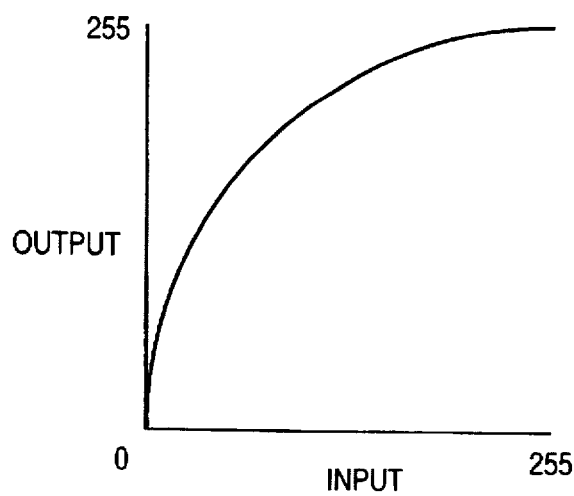

Moreover, in the first embodiment, descriptions have been given in a case where the image reverse process is performed for C, M and Y density data as shown in FIGS. 3A to 3C, and a case where transformation process is performed at the logarithmic transformation portion by using the transformation table shown in FIGS. 4A and 4B which includes the logarithmic transformation characteristics and image reverse characteristic. It is more advantageous to perform the image reverse process by using transformation table such as those shown in FIGS. 4A and 4B because fewer transformation processes are necessary and fewer tables are required for the transformation.

Further, besides those tables shown in FIGS. 3A-3C and 4 utilized in the transformation process, other tables may be stored in the ROM 119 and may be selected from the operation portion 122 as necessary. For example, in the present embodiment, complementary data for Y, M and C data is obtained by a linear transformation table, but the data may be obtained by using a non-linear transformation table. By having such configuration, a suitable transformation process depending on an original image can be selected.

[Second Embodiment]

Next, a second embodiment will be explained. The main structure of a two-color image forming apparatus in the second embodiment is identical to that of the first embodiment (FIG. 1). A control structure related to image processing is also identical to that of the first embodiment (FIG. 2). Hereinafter, the flow of image processing according to the second embodiment will be described with reference to the block diagram in FIG. 2.

An image is first read from an original document, placed on a document reader by the CCD line sensor 101 as R, G, and B image data 102. Then analog/digital conversion is performed by the A/D converter 103, and shading correction is performed for the digital signal by the shading correction portion 105 to correct nonuniformity of sensor output. Next, each of luminance signals 106: RED, GREEN and BLUE are logarithmically transformed into density signals 108: CYAN, MAGENTA and YELLOW by the logarithmic transformation portion 107. Then, at the color separator 109, a black signal K110 and a red signal R110 are generated.

Figure 7A:
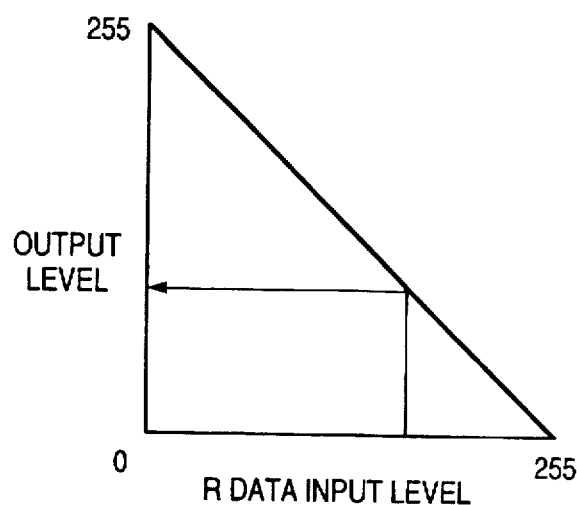
FIGS. 7A and 7B are graphs showing characteristics of density conversion of a black signal and a red signal for forming a two-color image.
Figure 7B:
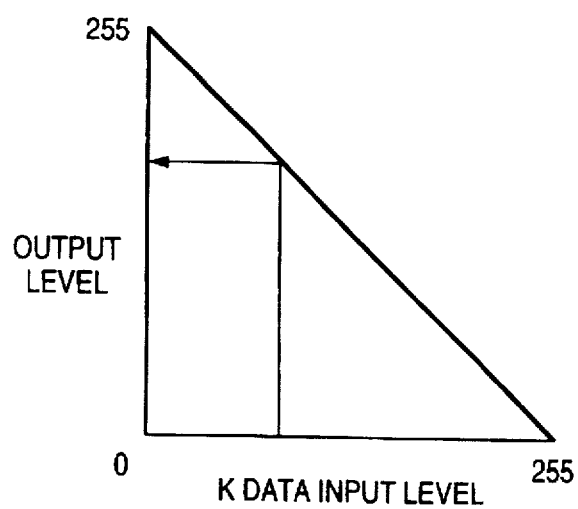

Herein, in the color separator 109, density level conversion is performed as shown in FIGS. 7A and 7B to reverse each density data of the black signal K110 and red signal R110. In this example, each density data is complemented. Plural types of such methods for transforming black and red signals may be provided depending on characteristics of an original image, or for user's selection. Further descriptions thereof will be given later.

Next, density gradient correction is performed for a printer by the gamma conversion portion 111. Since a red image is developed after a black image is developed, timing adjustment is performed for the red image signal 112 by the timing controller 113. Each image signal is converted to the black-developing laser beam 116 and the red developing laser beam 117 respectively by the laser drivers 115a and 115b and image recording utilizing two colors is executed.

Next, the method of reversing black and red density data will be described. Herein, the following two types of descriptions are provided as an example for the method of image reverse. (1) A color having a MAX value is selected from either the black density data or red density data in a two-color image, to form single-color image data with the selected color, and the resulting single-color image is reversed to form a reversed image. In this example, the density data is complemented as shown in FIGS. 7A and 7B. (2) Each pixel is examined as to whether or not it includes red density data. If red density data is not included in a pixel, black density data is reversed (in the present embodiment, complemented) for that pixel; and if red density data is included in the pixel, the red density data is outputted without any transformation.

Figure 8A:
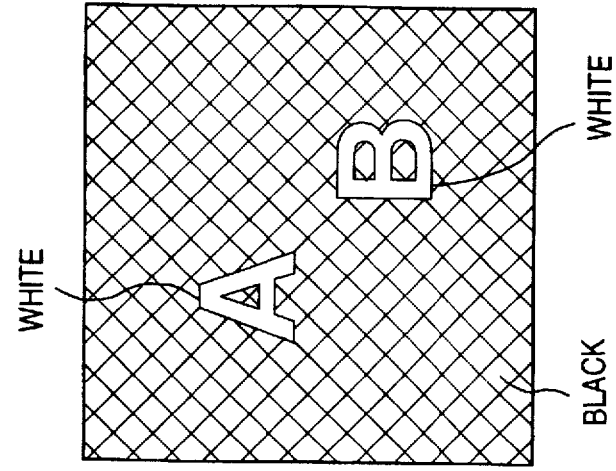
FIGS. 8A, 8B, 8C, 9A and 9B are diagrams explaining an image reverse process of a black and red image according to a second embodiment.
Figure 8B:
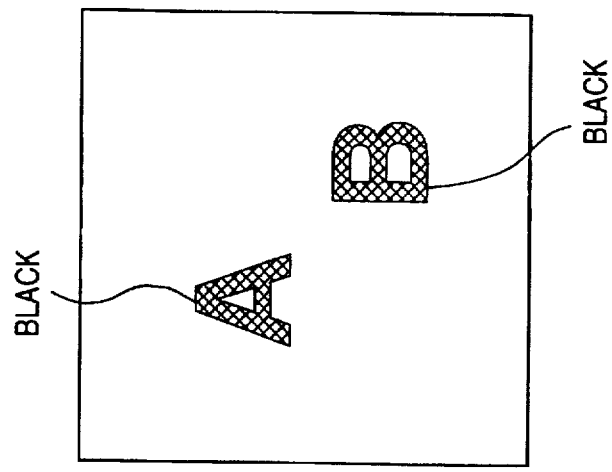
Figure 8C:
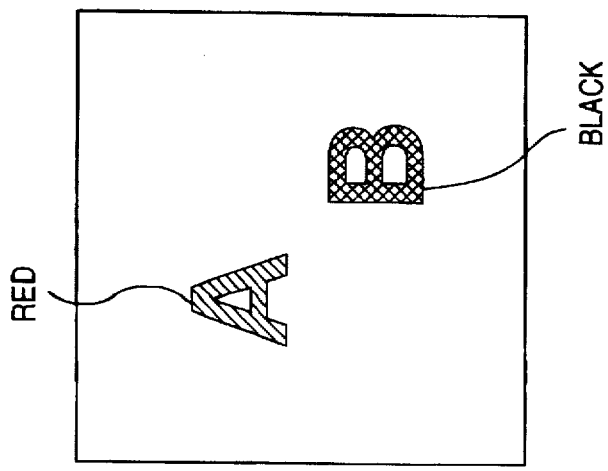

Each of the methods (1) and (2) as described above will be explained with reference to FIGS. 8A to 8C, 9A and 9B. FIGS. 8A to 8C illustrate transformation control of black and red images.

First, an explanation is given for the reverse process (1). FIG. 8A shows an image immediately after transformation processing in which the luminance signals 108: CYAN, MAGENTA and YELLOW are transformed to a black and red image by the color separator 109. FIG. 8A includes a red letter A and a black letter B. Among the density data of black and red, a color having a MAX value in the image is extracted, according to the image reverse technique (1). It is assumed in the example that black is extracted and the image is expressed in all black density data. FIG. 8B shows an image expressed by black density data as a result of the foregoing process. Reversing the black density data, a two-color reversed image with a white letter and a black background is obtained as illustrated in FIG. 8C.

Figure 9A:
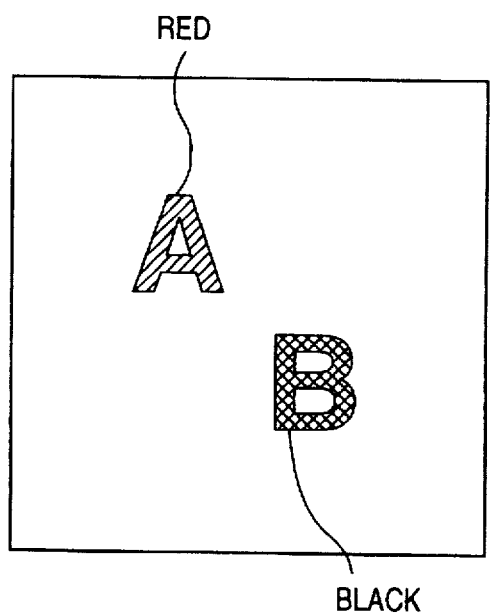
Figure 9B:
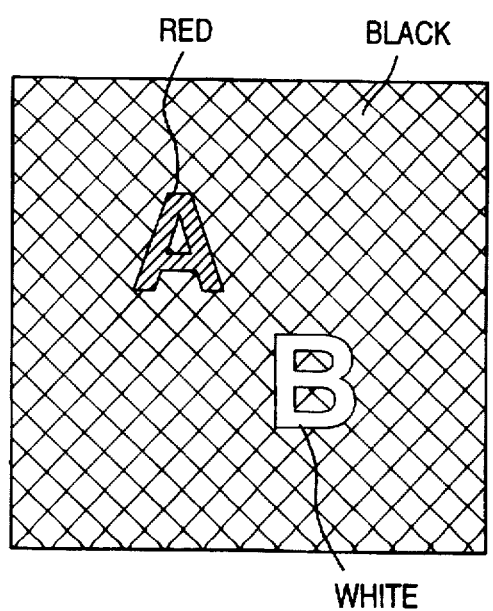

The reverse process (2) will-be described next. FIG. 9A shows an image immediately after the process of converting into a two-color image, which includes a red letter A and a black letter B. According to the image reverse technique (2), a pixel in the image not including red is reversed and a pixel including red is outputted without reversal. A two-color transformed image as a result of the process is shown in FIG. 9B.

According to the two-color image reverse process in the second embodiment, image reverse is performed on R (red) and K (black) data. The usage of such technique is mainly for an image including texts. The reverse process of image density is generally utilized for emphasizing purpose.

Steps of the foregoing transforming methods (1) and (2) will further be described with reference to the flowchart in FIG. 10.

Figure 11:
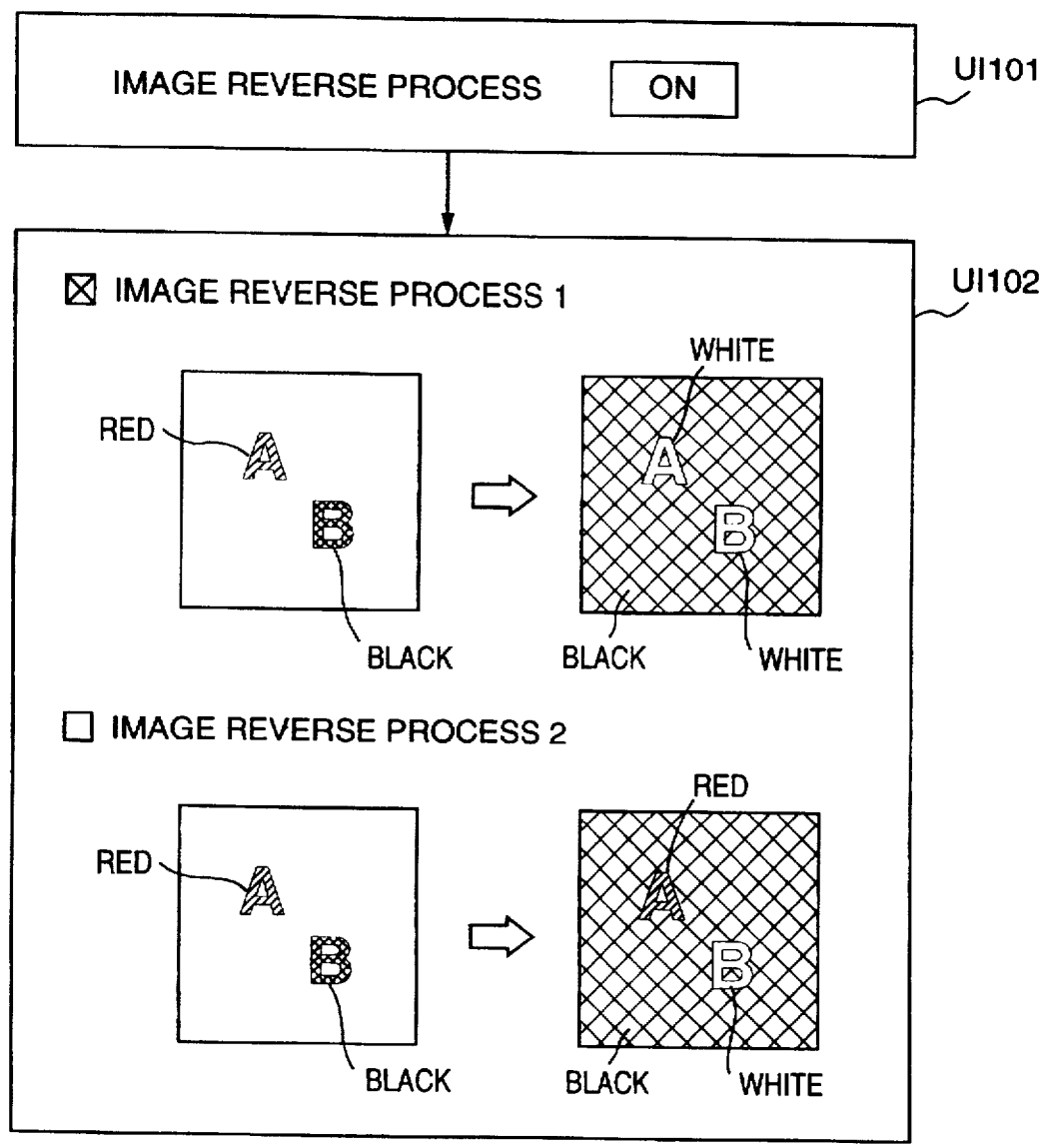
FIG. 11 is a block diagram of a user interface according to the second embodiment.

First, it is judged whether or not an image reverse processing mode for performing an image reverse process is turned ON at an interface unit UI101 in FIG. 11 which is indicated at the operation portion 122 (step S103). If it is judged that the image reverse processing mode is not turned ON, a two-color image is formed according to a normal process in which the image reverse process is not performed (step S108).

Meanwhile, if it is determined in step S103 that the image reverse processing mode is turned ON, the processing proceeds to step S104. A user can set a type of image reverse processing mode from a user interface of the UI102 shown in FIG. 11. In the present embodiment, either the above described image reverse process (1) (hereinafter referred to as "image reverse process 1") or the image reverse process (2) (hereinafter referred to as "image reverse process 2) is selected. In step S104, the image reverse processing mode set by the user is determined.

Note that in the user interface unit UI102, process examples for the two types of image reverse process are displayed, enabling a user to correctly select a desired image reverse process. FIG. 11 shows the state in which the image reverse processing mode 1 is selected at the user interface unit UI102 (a box for image reverse process is checked).

Figure 12:
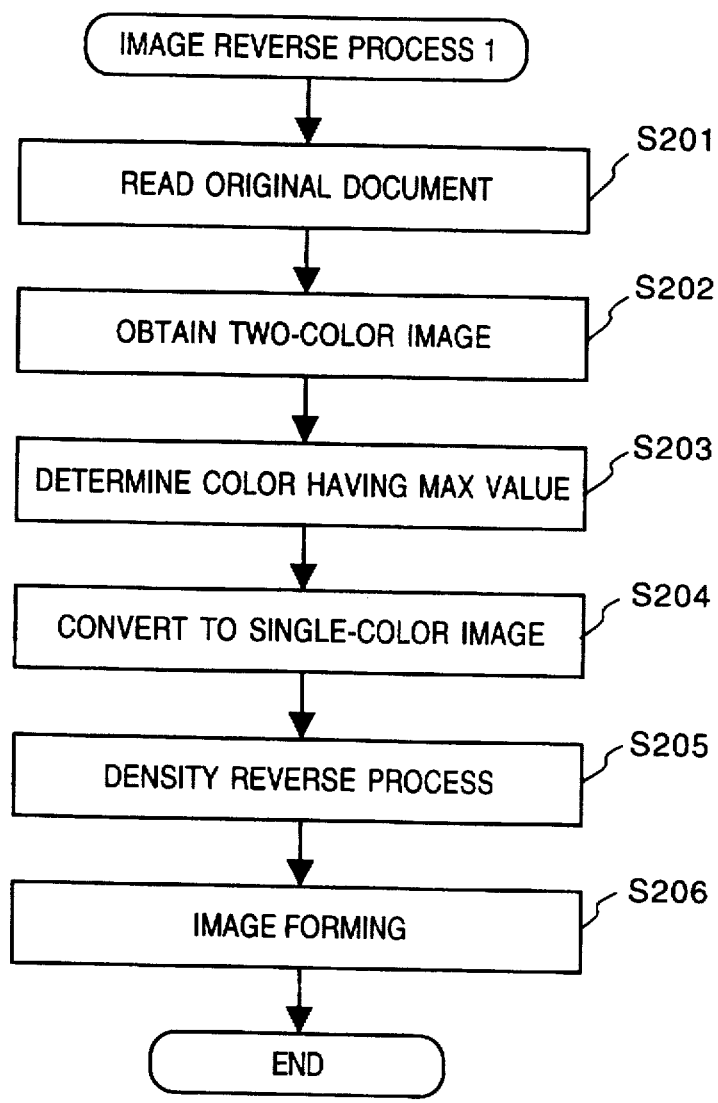
FIGS. 12 and 13 are flowcharts showing the steps of image reverse process according to the second embodiment.

When it is determined in step S104 that the image reverse process 1 is set, the processing proceeds from step S105 to step S106 where the image reverse process shown in FIG. 12 is executed. As a result, the image reverse process (image reverse process 1) described with reference to FIGS. 8A to 8C is executed.

The steps of the image reverse process 1 will be described in detail with reference to FIG. 12. First, an original document is read by a CCD 101 (step S201). Shading correction and logarithmic transformation described with reference to FIG. 2 are performed on the read image data and a two-color image in red and black is obtained by performing color separation by the color separator 109 (step S202). Then, it is determined which color has a higher density value (MAX value) in the twocolor image (step S203). The two-color image obtained in step S202 consists of the single color which has a higher MAX value (step S204). For instance, if the color having the MAX value is black, all red density data in the image is converted to black density data.

In step S205, a density reverse process is performed on the image data obtained in step S204 to obtain a reversed image. Then in step S206, gamma conversion is performed and a visible image is formed.

Figure 10:
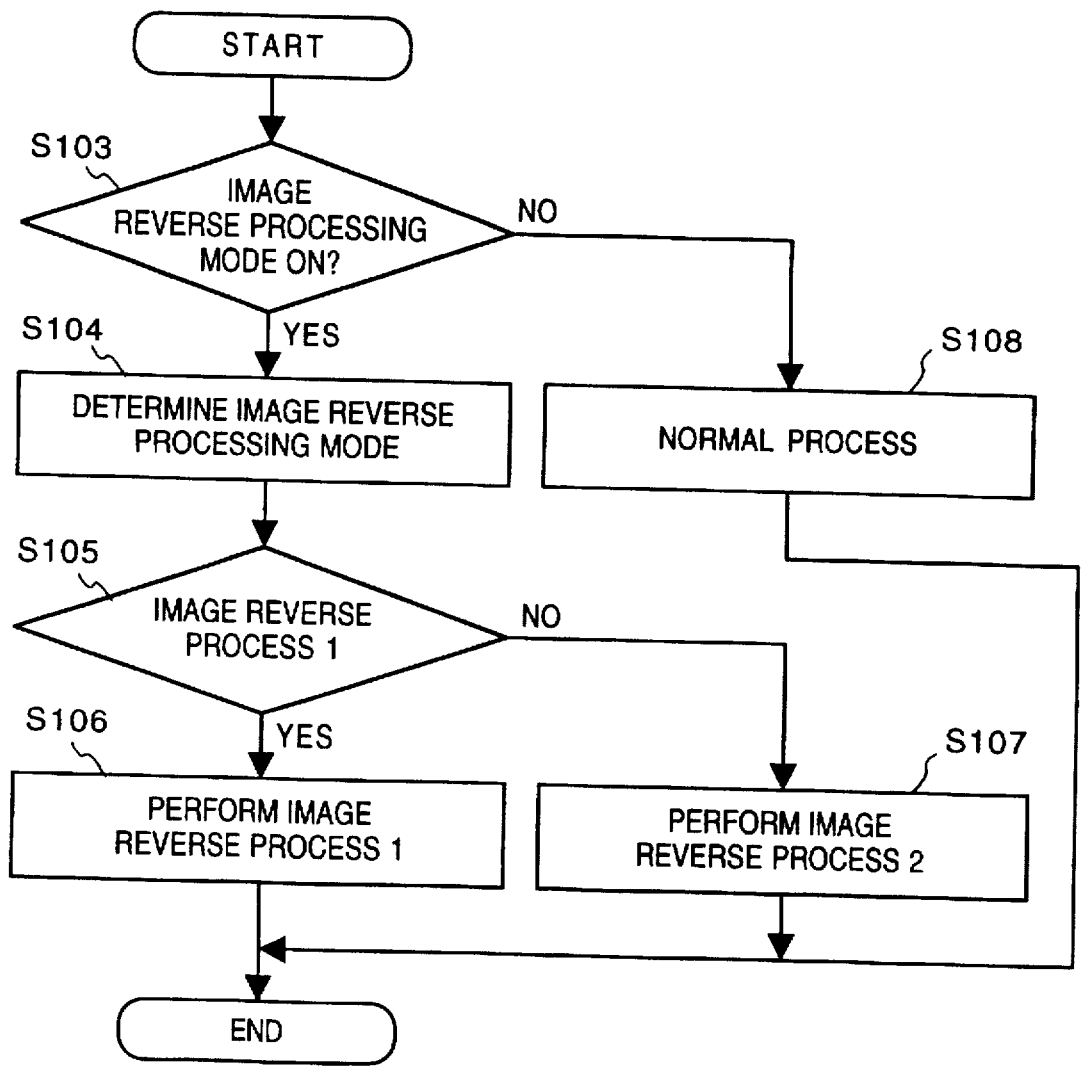
FIG. 10 is a flowchart of an image forming process according to the second embodiment.

Meanwhile, if the image reverse process 1 is not set in FIG. 10, the image reverse process 2 is performed. In this case, the image reverse method described with reference to FIGS. 9A and 9B is executed (step S107). Hereinafter, the process steps of the image reverse process 2 will be described.

Figure 13:
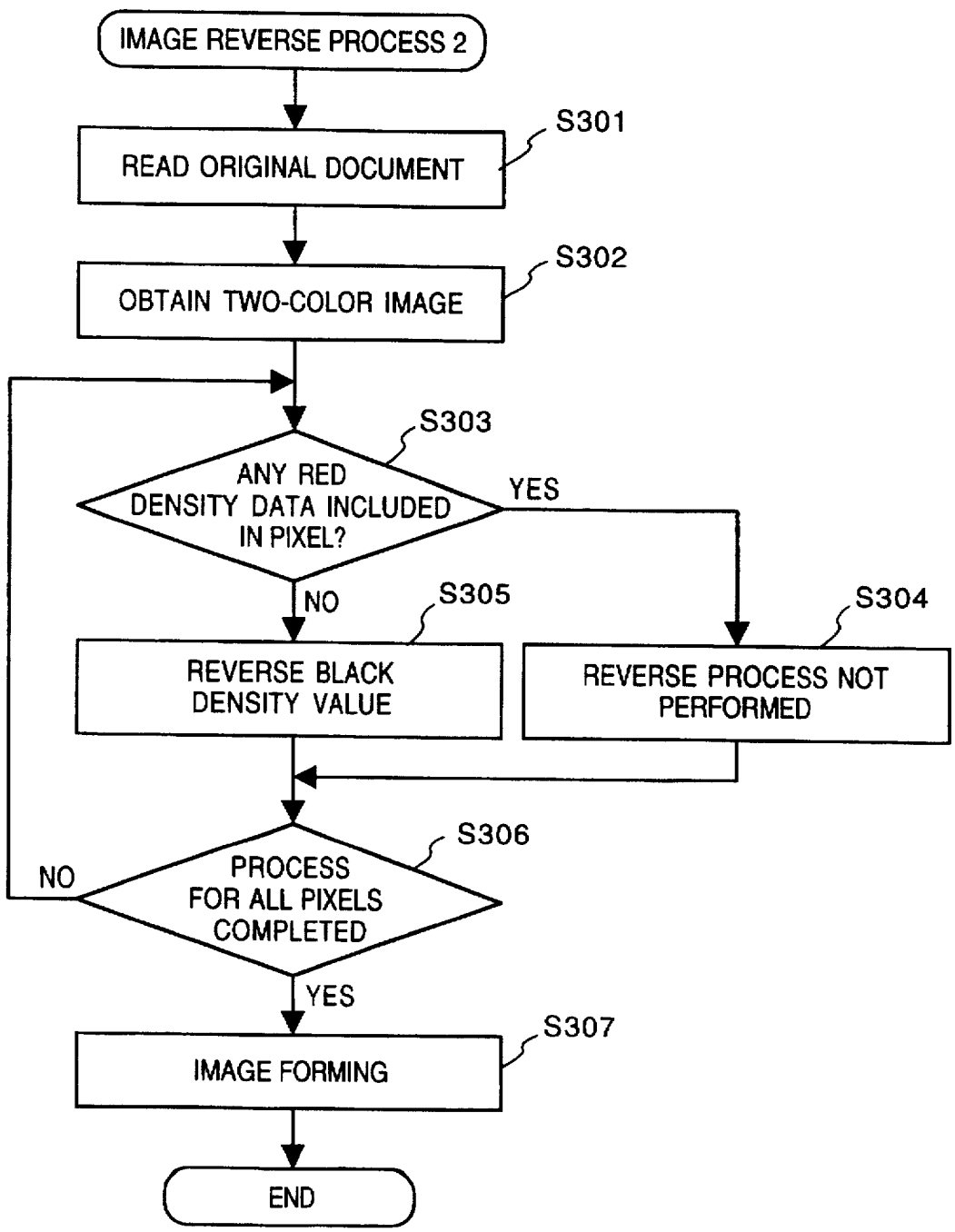

Steps S301, S302 in FIG. 13 are identical to the steps S201 and S202 in FIG. 12. At the time of transforming density of each pixel in step S303, it is determined whether or not red density data is included in a pixel subjected to being processed. For a pixel including red density data, density transformation is not performed, but is outputted as transformed image data (step S304). For a pixel not including red density data, black and white is reversed and the resulting data is outputted as reversed image data (step S305). After the foregoing density reverse processing is performed for all the pixels of the subject image data, processing proceeds from step S306 to step S307. In step S307, gamma conversion and the like is performed on the reversed image data obtained in the above described manner and a visible image is formed.

Reverse processing is not limited to the examples provided above. Reverse processes which achieve various effects can be provided. For instance, in the technique (2), pixels whose density is reversed are fixed to black data; however, density reverse may be executed on a color having a maximum value of density data.

Further, a structure may be established which allows selection of a desired technique from various two-color image transformation techniques as described in the first and second embodiment, so that a user can select a transformation effect depending on an image.

Moreover, the foregoing embodiments are given in a case of a black and red two-color image. Needless to say that other colors, applicable to a two-color image forming apparatus, can be utilized to execute the image reverse process with the similar configuration.

As has been described above, according to the present invention, an image reverse process is possible for an image constructed with two colors.

Furthermore, by comprising plural selectable techniques of image reverse processes, a most appropriate image reverse process can be performed for an image having different characteristics.

Note that the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments bring realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which comprises:
   reverse means for reversing color density of image data;
   separation means for separating image data into two colors and obtaining image data consisting of two colors; and
   output means for outputting the image data consisting of two colors to an image forming apparatus which forms a visible image consisting of two colors based on the two-color image data.

2. The image processing apparatus according to claim 1, wherein said separation means separates the image data obtained by said reverse means into two colors.

3. The image processing apparatus according to claim 1, wherein said reverse means reverses color density of the two-color image data obtained by said separation means.

4. An image processing apparatus comprising:
   reverse means for reversing color density of image data to obtain a density-reversed image data;
   separation means for separating the density-reversed image data obtained by said reverse means into two colors to obtain two-color image data consisting of two colors; and
   output means for outputting the two-color image data obtained by said separation means to an image forming apparatus which forms an image consisting of two colors.

5. The image processing apparatus according to claim 4, wherein said reverse means comprises:
   plural types of image reverse processing techniques for reversing color density of image data; and
   selecting means for selecting a desired image reverse processing technique from said plural types of image reverse processing techniques to be utilized by said reverse means.

6. The image processing apparatus according to claim 4, wherein said reverse means obtains density reversed data by reversing C, M and Y density data generated from R, G and B luminance data.

7. The image processing apparatus according to claim 4, wherein said reverse means obtains density reversed data by reversing C, M, Y and K density data generated from R, G and B luminance data.

8. The image processing apparatus according to claim 4, wherein said reverse means reverses density at the time of logarithmic transformation in which R, G and B luminance data is transformed to at least either of C, M and Y data or C, M, Y and K data.

9. An image processing apparatus comprising:
   separation means for separating image data into two colors to obtain two-color image data;
   reverse means for reversing the two-color image data obtained by said separation means to obtain reversed two-color image data; and
   output means for outputting the reversed two-color image data obtained by said reverse means to an image forming apparatus which forms an image consisting of two colors.

10. The image processing apparatus according to claim 9, wherein said reverse means comprises:
    plural types of image reverse processing techniques for reversing color density of image data; and
    selecting means for selecting a desired image reverse processing technique from said plural types of image reverse processing techniques to be utilized by said reverse means.

11. The image processing apparatus according to claim 9, wherein said reverse means selects a color having a maximum density value from colors utilized in the two-color image data, to form a single-color image data with the selected color, and reverses the single-color image data to obtain reversed image data corresponding to the two-color image.

12. The image processing apparatus according to claim 9, wherein said reverse means executes reversing process only for the density of the color having a maximum density value in the two-color image data, to obtain reversed two-color image data.

13. The image processing apparatus according to claim 9, wherein said two colors are red and black.

14. The image processing apparatus according to claim 9, wherein in the two-color image data consisting of a first and a second colors, if a pixel in the image does not include the second color, said reverse means reverses color density of the first color data.

15. An image processing method comprising the steps of:

reversing color density of image data to obtain a density-reversed image data;

separating the density-reversed image data obtained in said reversing step into two colors to obtain two-color image data consisting of two colors; and outputting the two-color image data obtained in said separating step to an image forming apparatus which forms an image consisting of two colors.

16. The image processing method according to claim 15, wherein said reversing step includes plural types of image reverse processing techniques for reversing color density of image data; and further comprising the step of selecting a desired image reverse processing technique to be utilized in said reversing step, from said plural types of image reverse processing techniques.

17. The image processing method according to claim 15, wherein in said reversing step, density reversed data is obtained by reversing C, M and Y density data generated from R, G and B luminance data.

18. The image processing method according to claim 15, wherein in said reversing step, density reversed data is obtained by reversing C, M, Y and K density data generated from R, G and B luminance data.

19. The image processing method according to claim 15, wherein in said reversing step, density is reversed at the time of logarithmic transformation in which R, G and B luminance data is transformed to at least either of C, M and Y data or C, M, Y and K data.

20. An image processing method comprising the steps of:

separating image data into two colors to obtain two-color image data which forms a two-color image;

reversing the two-color image data obtained in said separating step to obtain reversed two-color image data; and outputting the reversed two-color image data obtained in said reversing step to an image forming apparatus which forms an image consisting of two colors.

21. The image processing method according to claim 20, wherein said reversing step includes plural types of image reverse processing techniques for reversing color density of image data; and further comprising the step of selecting a desired image reverse processing technique from said plural types of image reverse processing techniques to be utilized in said reversing step.

22. The image processing method according to claim 20, wherein in said reversing step, a color having a maximum density value is selected from colors utilized in the two-color image data, to form a single-color image data with the selected color, and the single-color image data is reversed to obtain a reversed image data corresponding to the two-color image data.

23. The image processing method according to claim 20, wherein in said reversing step, an image reversing process is executed only for the density of the color having a maximum density value in the two-color image data, to obtain reversed two-color image data.

24. The image processing method according to claim 20, wherein said two colors are red and black.

25. The image processing method according to claim 20, wherein in the two-color image data consisting of a first and a second colors, if a pixel in the image does not include the second color, density of the first color data is reversed in said reversing step.

* * * * *

UNITED STATES PATENT AND TRADEMARK OFFICE
CERTIFICATE OF CORRECTION

PATENT NO. : 5,777,750

DATED : July 7, 1998

INVENTOR(S): YASUHIRO TAKIYAMA ET AL.

It is certified that error appears in the above-identified patent and that said Letters Patent is hereby corrected as shown below:

COLUMN 2 line 44,   "and a" should read --and the--.

COLUMN 4 line 21,   "table" should read --tables--.

COLUMN 5 line 38,   "will-be" should read --will be--;
   line 49,   "texts." should read --text.--; and
   line 50,   "emphasizing purpose" should read --purposes of emphasis--.

COLUMN 6 line 3,    "2) is" should read --2") is--.

UNITED STATES PATENT AND TRADEMARK OFFICE
CERTIFICATE OF CORRECTION

PATENT NO. : 5,777,750

DATED : July 7, 1998

INVENTOR(S) : YASUHIRO TAKIYAMA ET AL.

It is certified that error appears in the above-identified patent and that said Letters Patent is hereby corrected as shown below:

COLUMN 9 line 5, "colors" should read --color--.

COLUMN 10 line 33, "colors" should read --color--.

Signed and Sealed this

Ninth Day of February, 1999

Attest:

Attesting Officer

Acting Commissioner of Patents and Trademarks